(12) United States Patent
Young et al.

(10) Patent No.: US 9,643,563 B2
(45) Date of Patent: May 9, 2017

(54) AIRBAG MODULE WITH HEAT SHIELD

(71) Applicant: Key Safety Systems, Inc., Sterling Heights, MI (US)

(72) Inventors: Jeffrey Young, Bruce Township, MI (US); Calum Beattie, Rochester Hills, MI (US); Danielle Sciullo Marchand, Shelby Township, MI (US); Joseph A Lockemy, Clinton Township, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 14/758,285

(22) PCT Filed: Jan. 2, 2014

(86) PCT No.: PCT/US2014/010065
§ 371 (c)(1),
(2) Date: Jun. 29, 2015

(87) PCT Pub. No.: WO2014/107505
PCT Pub. Date: Jul. 10, 2014

(65) Prior Publication Data
US 2015/0353048 A1   Dec. 10, 2015

Related U.S. Application Data

(60) Provisional application No. 61/748,717, filed on Jan. 3, 2013.

(51) Int. Cl.
*B60R 21/261* (2011.01)
*B60R 21/264* (2006.01)
*B60R 21/217* (2011.01)
*B60R 21/26* (2011.01)

(52) U.S. Cl.
CPC .......... *B60R 21/261* (2013.01); *B60R 21/217* (2013.01); *B60R 21/264* (2013.01); *B60R 2021/2178* (2013.01); *B60R 2021/26076* (2013.01)

(58) Field of Classification Search
CPC ........................................... B60R 2021/26076
See application file for complete search history.

(56) References Cited

U.S. PATENT DOCUMENTS

| 4,944,527 A | * | 7/1990 | Bishop | B60R 21/201 |
| | | | | 280/728.2 |
| 5,378,011 A | * | 1/1995 | Rogerson | B60R 21/217 |
| | | | | 280/728.1 |

(Continued)

FOREIGN PATENT DOCUMENTS

SE   DE 102004005555 A1 *  9/2005  ............. B60R 21/26

*Primary Examiner* — Darlene P Condra
(74) *Attorney, Agent, or Firm* — Markell Seitzman

(57) ABSTRACT

A driver airbag module (20) comprising a cover (22), a housing (40) matably configured with cover (22), a pyrotechnic inflator (60) having a flange (70), and airbag fitted within the space between housing (40, 40*a*) and cover (22), the airbag inflating with gas provided by the inflator (60), wherein the heat shield (80) is positioned between the lower surface (42) of housing (40, 40*a*) and an upper surface (71) of flange (70), the heat shield protectively shielding surface (42) from the heat transfer from flange (70) to prevent surface (42) from melting.

14 Claims, 4 Drawing Sheets

(56) References Cited

U.S. PATENT DOCUMENTS

| | | | | |
|---|---|---|---|---|
| 5,393,090 | A * | 2/1995 | Shepherd | B60R 21/276 280/728.1 |
| 5,398,968 | A * | 3/1995 | Emambakhsh | B60R 21/237 280/732 |
| 5,470,105 | A * | 11/1995 | Rose | B60R 21/261 280/728.1 |
| 5,588,668 | A * | 12/1996 | Emambakhsh | B60R 21/2171 280/728.2 |
| 5,836,608 | A * | 11/1998 | Soderquist | B60R 21/217 280/728.2 |
| 5,860,672 | A * | 1/1999 | Petersen | B60R 21/217 280/728.2 |
| 6,149,192 | A * | 11/2000 | Swann | B60R 21/261 280/740 |
| 6,206,417 | B1 * | 3/2001 | Soderquist | B60R 21/261 280/736 |
| 6,802,526 | B2 * | 10/2004 | Dumbrique | B60R 21/201 280/728.2 |
| 7,690,680 | B2 * | 4/2010 | Meissner | B60R 21/217 102/704 |
| 7,731,234 | B2 * | 6/2010 | Adler | B60R 21/205 280/728.2 |
| 8,408,582 | B2 * | 4/2013 | Lunt | B60R 21/217 280/728.2 |
| 8,876,158 | B2 * | 11/2014 | Yamazaki | B60R 21/217 280/736 |
| 2002/0130493 | A1 * | 9/2002 | Ford | B60R 21/21656 280/728.2 |
| 2003/0085553 | A1 * | 5/2003 | Ford | B60R 21/233 280/728.3 |
| 2007/0222196 | A1 * | 9/2007 | Harvey | B60R 21/2346 280/740 |
| 2010/0230943 | A1 * | 9/2010 | Kimmich | B60R 21/2171 280/737 |

* cited by examiner

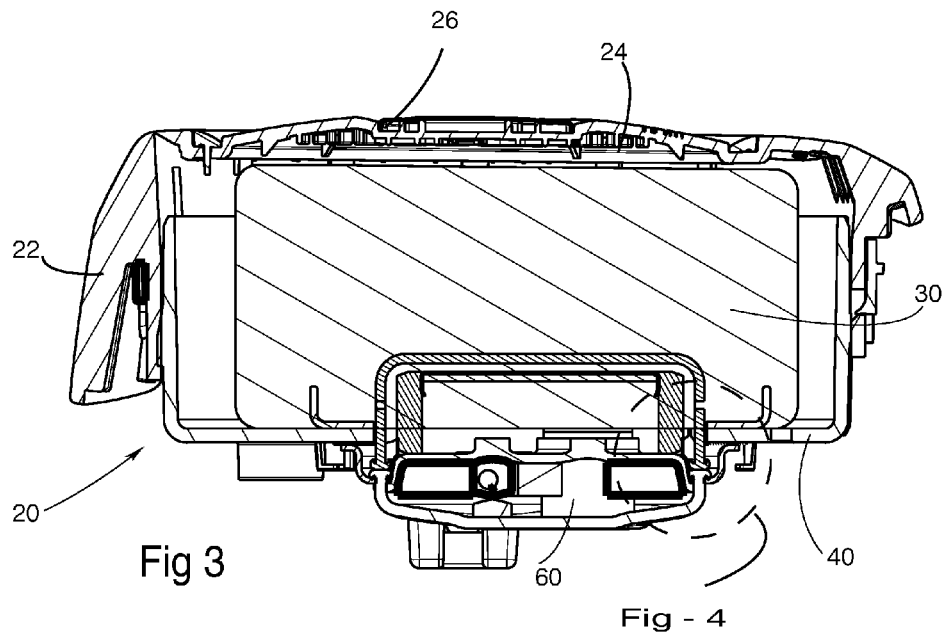
Fig 3
Fig - 4
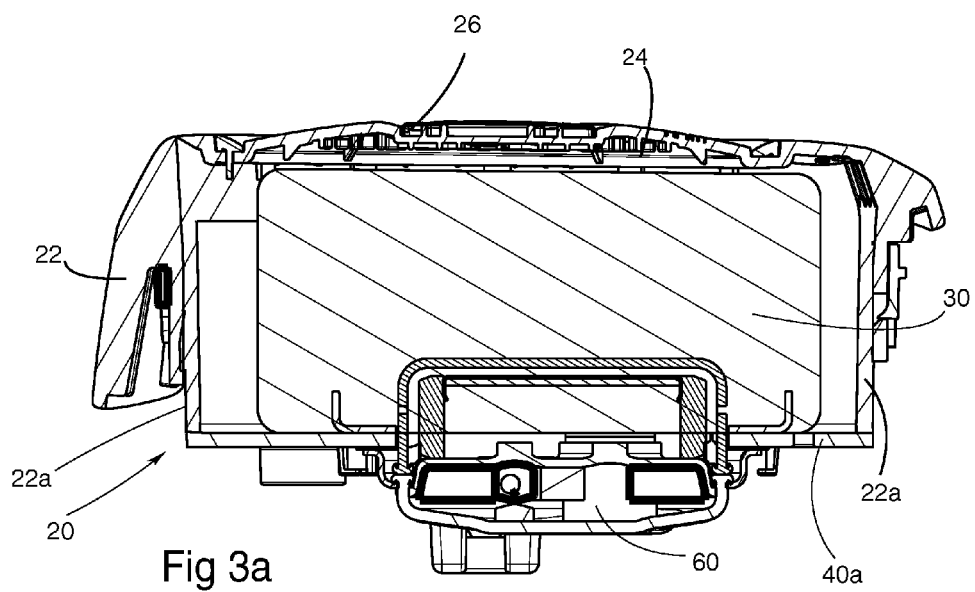
Fig 3a

AIRBAG MODULE WITH HEAT SHIELD

RELATED APPLICATIONS

This application claims benefit of priority to PCT Application Serial Number PCT/US14/10065 filing date of Jan. 2, 2014, the disclosure of which is incorporated herein by reference in its entirety.

BACKGROUND AND SUMMARY OF THE INVENTION

The present invention relates generally to airbag modules and more specifically to a driver airbag module, however, the invention is usable with many types of modules.

A driver or passenger airbag module typically includes a housing and a frangible cover secured to the walls of the housing. The housing is configured to receive a folded airbag, which is often referred to as a bag pack, and an inflator. The most commonly used inflator in driver airbag modules is a pyrotechnic inflator. Pyrotechnic inflators are being used more often for passenger and side airbag modules. The typical pyrotechnic inflator includes a central cylindrical member which houses the fuel and one or more igniters to ignite the fuel. Additionally, extending from the cylindrical member is a flange adapted to be connected to the lower surface of the housing. Upon ignition of the inflator a significant amount of heat is generated which by convection extends out to the housing. Early housings for driver airbag modules were fabricated from metal where the excess heat was not a problem.

The present invention comprises the addition of a heat shield situated between the inflator flange and a mating surface of a plastic housing for an airbag. A gasket interposes the mating surfaces. The purpose of this gasket is to create a pneumatic or hydraulic seal.

More specifically, the invention comprises: an airbag module 20 comprising a cover 22, a housing 40 matably configured with cover 22, a pyrotechnic inflator 60 having a flange 70, and an airbag fitted within the space between housing 40 and cover 22. The airbag is inflated with gas provided by the inflator 60. The heat shield 80 is positioned between the lower surface 42 of housing 40 and a complementary surface 71 of flange 70, the heat shield protectively shields surface 42 from the heat transfer from flange 70 to prevent surface 42 from melting.

BRIEF DESCRIPTION OF THE DRAWINGS

FIG. 3 is a cross-sectional view showing the major components of the present invention taken through section line A-A of FIG. 2.

FIG. 3*a* is a variation of FIG. 3 showing a housing which is plate-like.

DETAILED DESCRIPTION OF THE DRAWINGS

Figure 1:
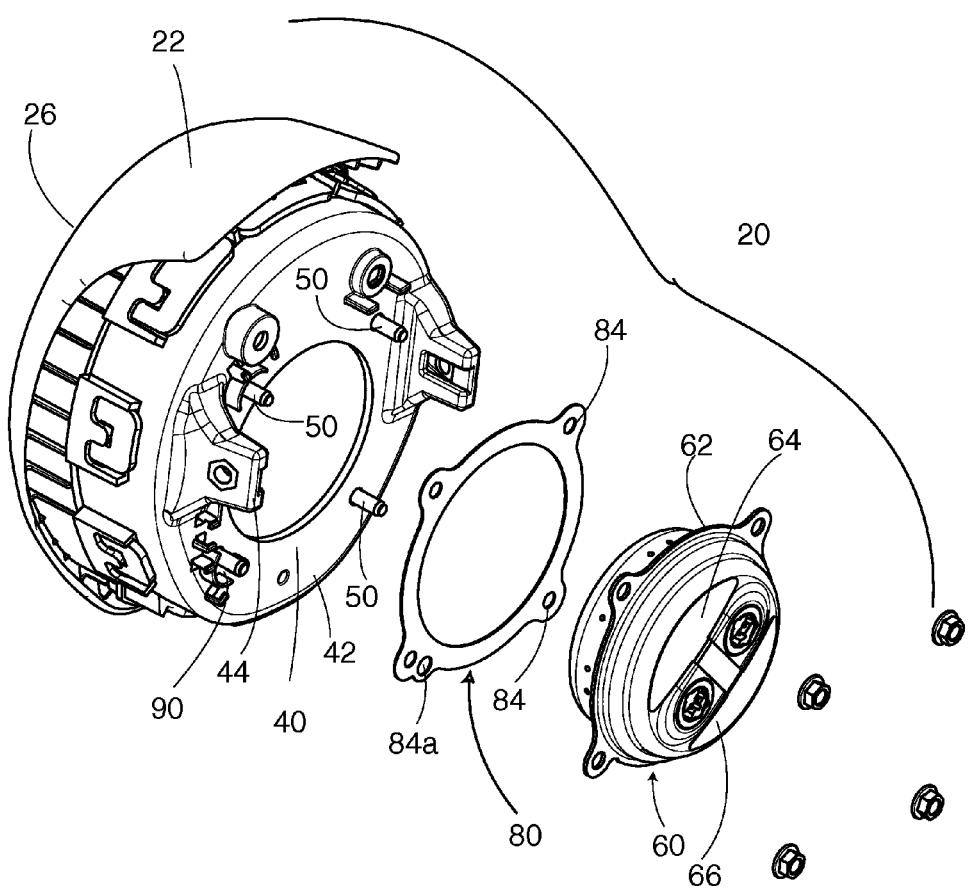
FIG. 1 is an exploded view showing the major components of the present invention.

Reference is made to FIG. 1 which illustrates the major components of the present invention. FIG. 1 illustrates an airbag module 20 comprising a cover 22 fabricated of plastic and includes an upper surface 24 having a frangible seam 26. The seam is opened upon inflation of the airbag 30. Module 20 further includes a housing 40. The housing is preferably made of suitable polymer or plastic materials. The cover further includes one or more sides 28. The housing is configured to mate with the sides 28 of cover 22 in a known manner such as a snap-fit or other known way. Housing 40 includes a lower surface 42 that includes a central opening 44; the housing further includes one or more sides 46. A plurality of fasteners 50 is secured to the lower surface of the housing. Module 20 further includes an inflator 60, the inflator has a cylindrical housing 62 in which is stored propellant 64. The propellant is ignited by one or more igniters 66 of known construction. The inflator further includes a mounting flange 70 extending about a lower portion 68 of the inflator. The cylindrical portion 62 of inflator 60 can fit within opening 44 of the housing and into portions of the folded airbag 30. Upon activation of the inflator, inflation gas enters airbag 30. As the airbag expands it will bear against surface 24 of the cover 26 causing it to rupture. The heat shield 80 interposes the lower surface 42 of housing 40 and surface 71 of flange 70. The heat shield 80 includes a central opening 82 that is approximately the same size as opening 44 of housing 40. As the heat shield is mounted to the housing 40 the respective mounting fastener extends through a respective opening 84 in the heat shield 80. As illustrated in FIG. 3*a*, a housing, which is sometimes referred to as a support member, can substantially be generally shaped as a plate 40*a*. It is not necessary that the plate be flat. In FIG. 3*a* the plate 40*a* mates with sides 22*a* of the cover 20.

Absent the heat shield 80, surface 71 of the inflator flange 70 would be placed directly against surface 42 of housing 40 (or alternatively the plate 40*a*). As previously mentioned housing 40 or 40*a* is made of plastic or a resin. The housing 40 is essentially a polymer or plastic with a given melting point. Inflator 60 is capable of generating a sufficient amount of heat and transferring same to flange 72 which, absent the heat shield, could be sufficient to melt the housing 40,40*a*.

Heat shield 80 is preferably made of a material capable of absorbing the heat transferred from the inflator flange 70. In the preferred embodiment the heat shield is made of 840 denier woven nylon or polyester material coated on both sides with silicon.

Figure 2:
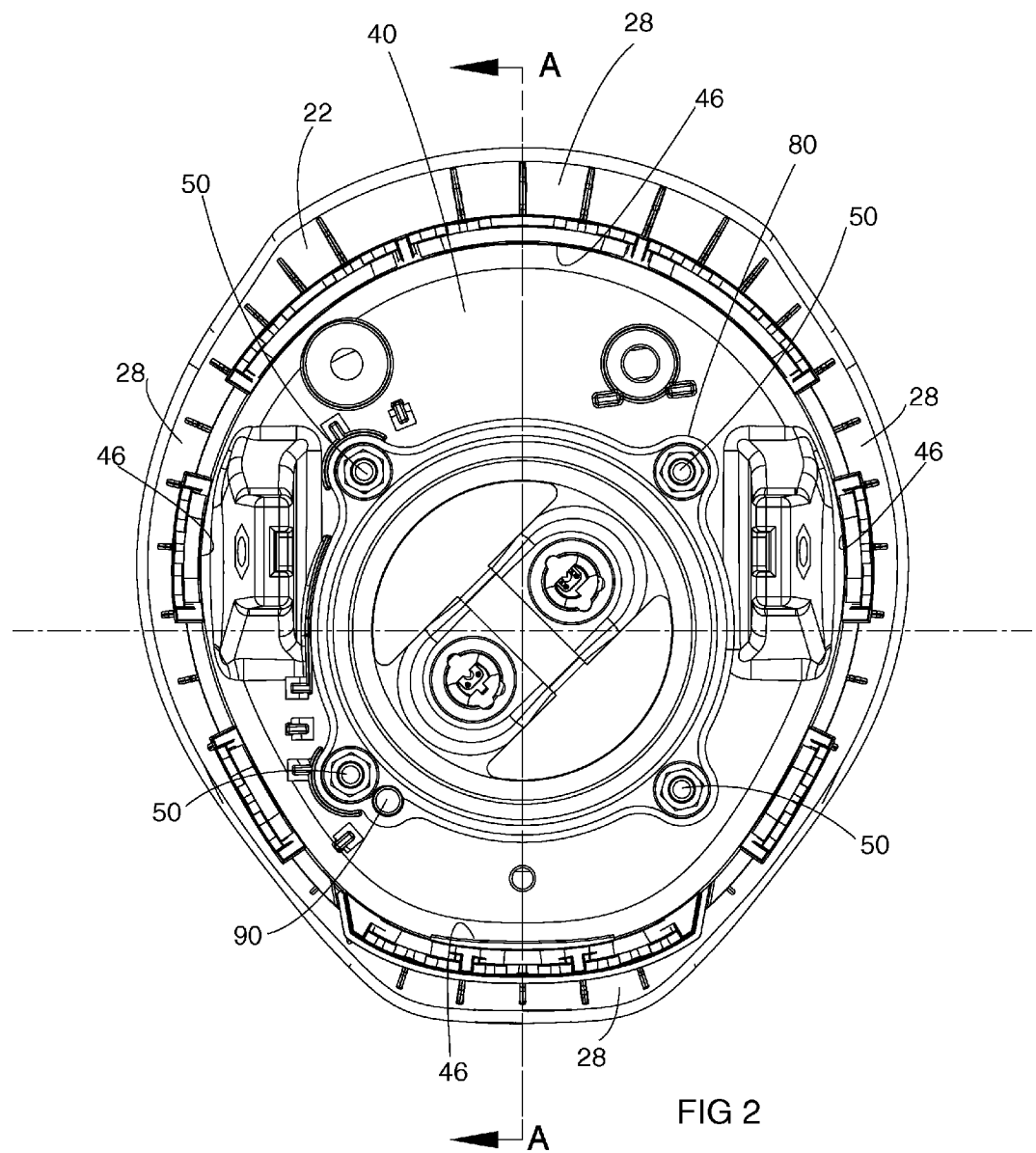
FIG. 2 is a bottom plan view of the module of FIG. 1.
Figure 5:
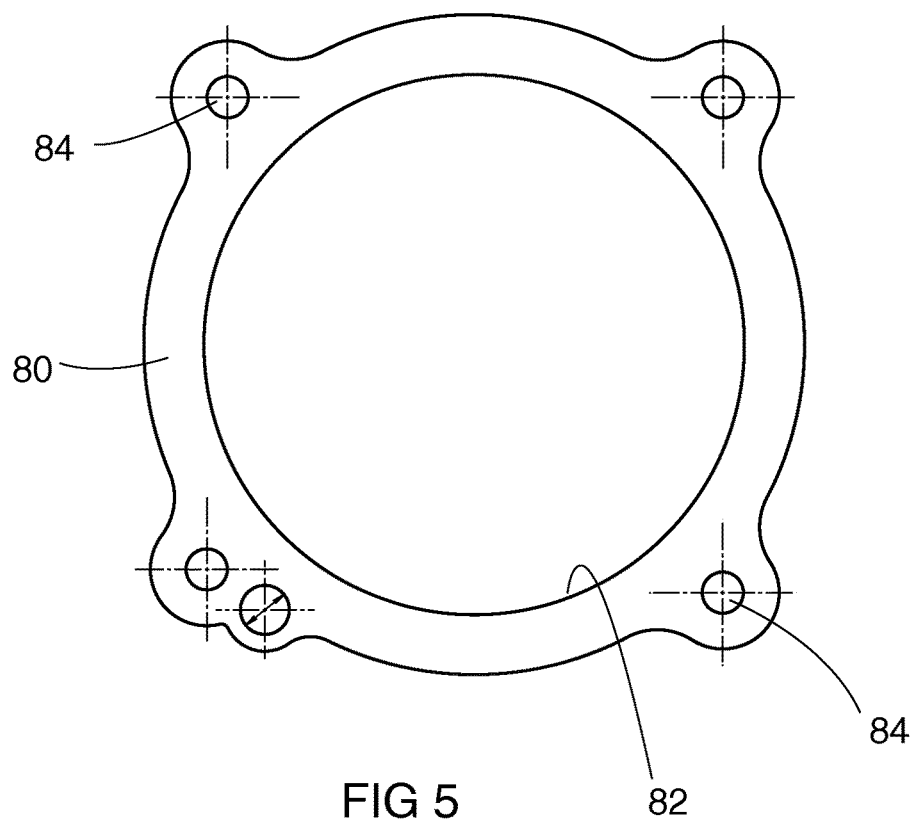
FIG. 5 is a plan view of a heat shield.
Figure 4:
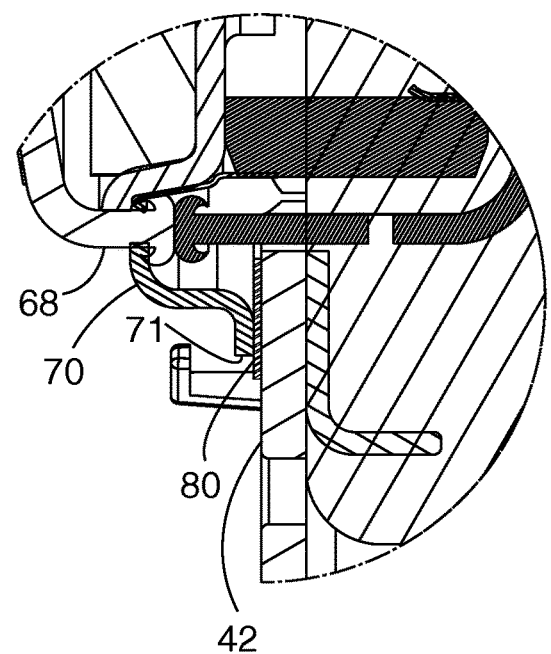
FIG. 4 is an expanded view of a portion of FIG. 3 and shows the heat shield in place upon a lower surface of the module housing.

Reference is briefly made to FIGS. 1 and 2. FIG. 2 shows fasteners 50 extending through openings 84 in the heat shield 80. Additionally the lower surface 42 includes an extending column 90 in the shape of a circular cylinder. Heat shield 80 further includes an additional opening 84*a* configured to fit about the extending column 90. The combination of the extending column 90 and the additional opening 84*a* adds mistake proofing which will permit the heat shield 82 to be fit to the fasteners 50 in only one orientation.

Many changes and modifications in the above-described embodiment of the invention can, of course, be carried out without departing from the scope thereof. Accordingly, that scope is intended to be limited only by the scope of the appended claims.

The invention claimed is:

1. An apparatus including a heat shield (80) configured to be placed between a lower surface (42) of a plastic support member (40, 40*a*) of an airbag (20) and an upper surface (71) of an inflator flange (70), the heat shield composed of a material sufficient to prevent the transfer of heat from the inflator flange in an amount sufficient to cause the lower surface of the support member to begin to melt; wherein the inflator flange (70) is curved in a direction facing the support member (40, 40a).

2. An airbag module (20) comprising a cover (22), a support member (40, 40a) matably configured with the cover (22), a pyrotechnic inflator (60), and airbag (30) fitted within the space between a housing (40) and the cover (22), the airbag inflating with gas provided by the inflator (60), wherein the heat shield (80) is positioned between a lower surface (42) of housing (40) and an upper surface (71) of cooperating inflator flange (70), the heat shield protectively shielding surface (42) from the heat transfer from inflator flange (70) to prevent surface (42) from melting.

3. The airbag module (20) according to claim 2 wherein the cooperating inflator flange is a mounting flange (70) of the inflator (60) having the upper surface (71).

4. The driver airbag module (20) according to claim 3 wherein the inflator flange (70) is curved in a direction facing the housing (40).

5. The airbag module (20) according to claim 2 wherein the lower surface (42) includes an extending column (90) in the shape of a circular cylinder.

6. The airbag module (20) according to claim 5 wherein heat shield (80) further includes an additional opening (84a) configured to fit about the extending column (90).

7. The airbag module (20) according to claim 6 wherein the combination of the extending column (90) and the additional opening (84a) adds mistake proofing which will permit the heat shield (82) to be fit to the fasteners (50) in only one orientation.

8. An airbag module according to claim 2 wherein the heat shield (80) includes a central opening (82) that has a size equal to an opening (44) of a housing.

9. The airbag module (20) according to claim 8 wherein the heat shield (80) is mounted to the housing (40) by mounting fasteners extending through respective openings (84) in the heat shield (80).

10. The airbag module (20) according to claim 9 wherein the housing (40) is shaped as a plate (40a).

11. The airbag module (20) according to claim 10 wherein the plate (40a) is flat.

12. The airbag module (20) according to claim 11 wherein the plate (40a) mates with sides (22a) of the cover (22).

13. The airbag module (20) according to claim 12 wherein the housing (40) or the plate (40a) is made of plastic or a resin.

14. An airbag module (20) comprising a cover (22), a support member (40, 40a) matably configured with the cover (22), a pyrotechnic inflator (60), and airbag (30) fitted within the space between a housing (40) and the cover (22), the airbag inflating with gas provided by the inflator (60), wherein the heat shield (80) is positioned between a lower surface (42) of housing (40) and an upper surface (71) of cooperating inflator flange (70), the heat shield protectively shielding surface (42) from the heat transfer from inflator flange (70) to prevent surface (42) from melting;
  wherein the material of the heat shield (80) is made of 840 denier woven nylon or polyester material coated on both sides with silicon.

\* \* \* \* \*